WITNESSES:
Bernard R. Gregory
James F. Young

INVENTORS
Walter C. Borck, Jr., John G. Gregory,
James R. Hudson & John C. Murtha.
BY Dean Schron
ATTORNEY

PROCESSING ELEMENT ARRAY

ROUTING ARRAY

ROUTING REGISTER INFORMATION TRANSFERS

ROUTING REGISTER 3

REGISTER TO REGISTER TRANSFER

PROCESSING ELEMENT PE2

LAPLACE EQUATION SOLOUTION

SEQUENTIAL OPERATION SEGMENT 1

Z=(A+B)C/D

| TIME | OUTPUT SEGMENT n-1 | OUTPUT SEGMENT n | OUTPUT SEGMENT n+1 |
|---|---|---|---|
| $t_1$ | $A_1+B_1$ | 0 | 0 |
| $t_2$ | $A_2+B_2$ | $(A_1+B_1)C_1$ | 0 |
| $t_3$ | $A_3+B_3$ | $(A_2+B_2)C_2$ | $(A_1+B_1)C_1/D_1$ |
| $t_4$ | $A_4+B_4$ | $(A_3+B_3)C_3$ | $(A_2+B_2)C_2/D_2$ |
| $t_5$ | | $(A_4+B_4)C_4$ | $(A_3+B_3)C_3/D_3$ |
| $t_6$ | | | $(A_4+B_4)C_4/D_4$ |

United States Patent Office 3,544,973

Patented Dec. 1, 1970

3,544,973

VARIABLE STRUCTURE COMPUTER

Walter C. Borck, Jr., West Acton, Mass., and John G. Gregory, White Marsh, James R. Hudson, Charlestown, and John C. Murtha, Baltimore, Md., assignors to Westinghouse Electric Corporation, Pittsburgh, Pa., a corporation of Pennsylvania Filed Mar. 13, 1968, Ser. No. 712,708

Int. Cl. G06f *15/16*

U.S. Cl. 340—172.5 18 Claims

ABSTRACT OF THE DISCLOSURE

A computer which includes a central control for controlling a plurality of similar computer segments. Each segment has a sequencer means, a plurality of processing elements for carrying out logic and arithmetic operations, a like plurality of memory units for storing instructions and for storing data, and a like plurality of routing registers for transferring information to and from the memory unit and to and from the processing elements. The sequencer means is selectively operable to receive instructions from the central control or from the memory units to provide control signals for controlling operations in its associated segment. The routing registers are additionally connected for transferring information to other routing registers of the segment, routing registers of other segments, and to an input/output means whereby information may be placed in selected segments and the results of various computations may be transferred to suitable read-out means or other types of utilization means. In a first operating condition the central control provides identical instructions simultaneously to all the sequencers such that all processing elements of the computer receive the same control signals. In a second operating condition the sequencer of one segment may receive instructions from the memory units of that segment while being non-responsive to instructions provided by the central control. In the second operating condition with one computer segment operating independently of the others, one processing element of that segment may function to carry out logic and arithmetic operations while the remaining processing elements of that segment function as a fast access memory storage for the storage of data used in the logic and arithmetic computations.

BACKGROUND OF THE INVENTION

Field of the invention

The invention in general relates to computers, and particularly to an array type computer including a plurality of similar or identical processing elements.

Description of the prior art

In the design of computer systems there is a continuing goal of increased computational power and program flexibility. In the development of large scale computers, computer programing analysts have been increasing the scope, quantity and complexity of the applications of computer systems and as a result computer systems are generally designed for higher speeds, including lower propagation delays in circuits containing greater logical power. Other objects in computer design are the tailoring of a particular computer to a specific application, and the utilization of greater parallelism in the logical organization of the computer.

Basically the parallel type computer generally includes an array of identical processing elements each for carrying out logic and arithmetic operations, and for greater flexibility in control, the processing elements are all under the simultaneous control of a central control means which provides identical control signals to the array of processing elements. Such parallel network computers are particularly well adapted for the solution of problems in areas such as matrix arithmetic, partial differential equations, radar data processing, numerical weather forecasting, to name a few.

Another type of computer organization is the well-known sequential computer which is a fast operating computer containing a single logic and arithmetic unit and well adapted for a great variety of applications.

When use is made of a parallel network computer, there arise certain computation al situations where it is difficult to obtain full and efficient usage of the parallel network characteristics since some of the computation needed is inherently sequential. A sequential type machine does not have the capabilities of a parallel network machine and therefore sacrifices in computational speed where certain parallel type computations are involved.

It is a general object of the present invention to provide a new and improved computer system which provides the advantages of different computing systems of the prior art, within a single computing system.

Another object is to provide a computer which can internally restructure itself into most efficient organization and perform calculations in the solution of a greater variety of problems.

SUMMARY OF THE INVENTION

The variable structure computer of the present invention includes a central control means controlling a plurality of similar computer segments, each segment having a sequencer means for controlling various operations within its associated segment, a plurality of similar processing elements for carrying out logic and arithmetic operations, and memory means including a memory unit for each processing element. Each memory unit is operable to store instructions and data used in the logic and arithmetic operations. Information transfer means in the form of a plurality of routing registers is operable to transfer information to and from an input/output means, to and from the processing elements, to and from the memory units, to and from other routing registers within its associated segment, and to and from routing registers of other segments.

The variable structure computer includes circuit means for operating all of the segments in an identical manner and in response to predetermined conditions, at least one of the segments may be operated independently of the other segments of the plurality. In the embodiment illustrated herein this is accomplished by providing means for selectively providing the sequencer with instructions from either the central control means or from the memory units within the sequencer segment.

DESCRIPTION OF THE PREFERRED EMBODIMENT

Figure 1:
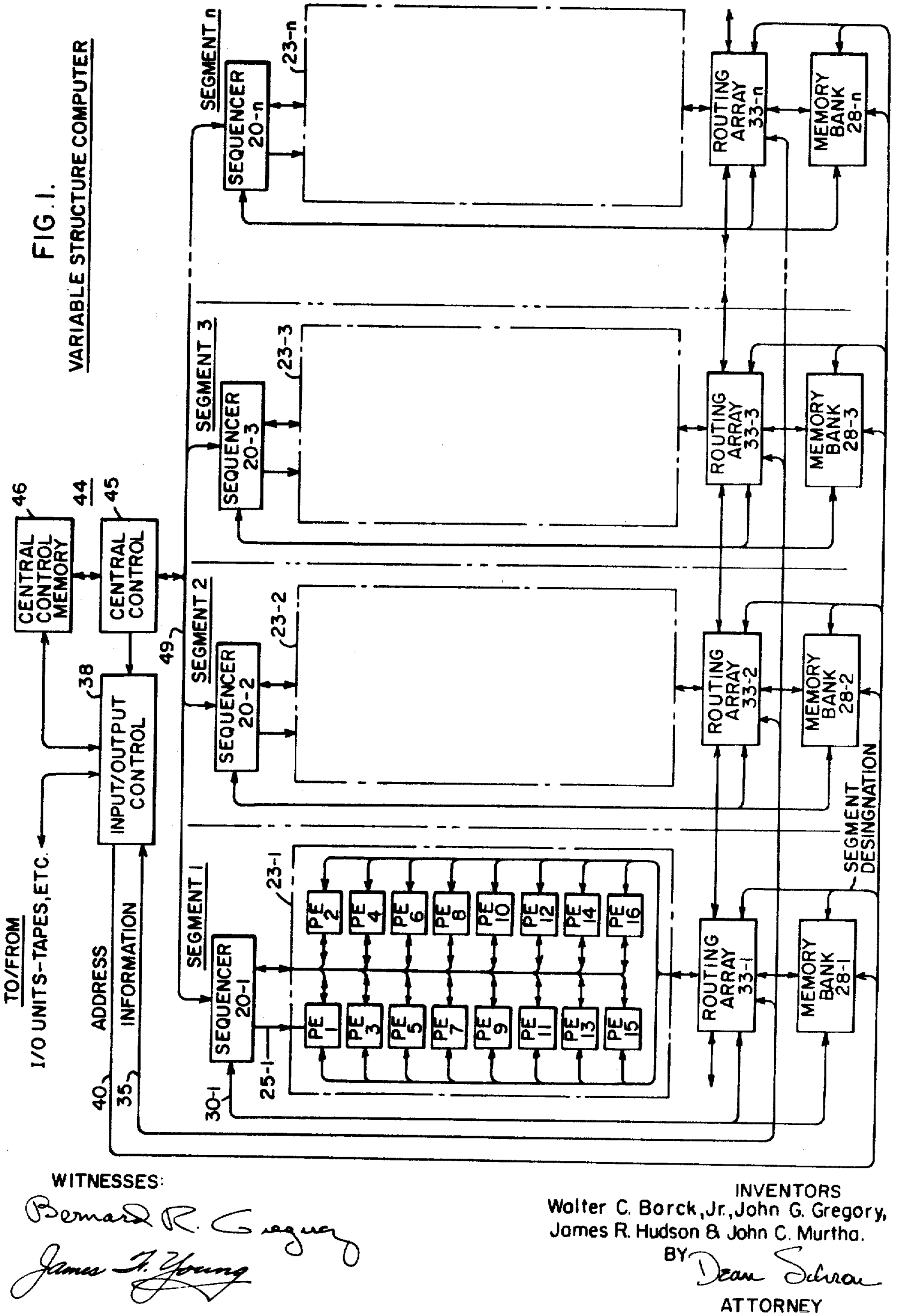
FIG. 1 illustrates in general block diagram form a variable structure computer according to the present invention.

Reference is now made to FIG. 1 illustrating a preferred embodiment of the variable structure computer of the present invetnion. The computer includes a plurality of computer segments designated as segments 1, 2, 3 . . . *n*. All of the segments are identical and each includes sequencer means for providing control signals to control the various operations within its associated segment. In the description to follow a component reference numeral may be followed by a hyphen and a numerical designation indicating in which segment the component is located. Accordingly, the sequencer means for controlling segment 1 is designated as sequencer 20–1, for segment 2 as sequencer 20–2, for segment 3 as sequencer 20–3, etc. The sequencer 20–1 will be described subsequently in FIG. 7. Since the segments are identical, the following description relative to segment 1 may, with appropriately different numerical designation, be used to describe the other segments.

In order to carry out various logic and arithmetic operations in response to control signals from the sequencer 20–1, there is provided an array of processing elements 23–1. The array is comprised of 16 processing elements designated PE1 to PE16, arranged in a 2 x 8 array, it being understood that other numbers and arrays of processing elements may be utilized. All of the processing elements are seen to be communicative with the sequencer 20–1 and in addition a special line 25–1 is seen to connect sequencer 20–1 with only processing element 1. The terminology "line" utilized herein is meant to include one or more signal carrying leads or paths. The processing element array will be described subsequently with respect to FIG. 2 and a typical processing element will be described with respect to FIG. 8.

In order to store information for use in the logic and arithmetic operations of the processing elements, there is provided memory means in the form of memory bank 28–1 and in a preferred embodiment includes a plurality of memory units each for the storage of data for a respective one of the processing elements. Memory bank 28–1 is additionally operable to store instructions for use by sequencer 20–1 when the computer is in a certain operating condition. Control signals for the memory bank 28–1 and instructions for the sequencer 20–1 are transmitted via line 30–1. Memory bank 28–1 will be described subsequently with respect to FIG. 3.

Information transfer means in the form of routing array 33–1 is provided in order to transfer information within the segment. In a preferred embodiment the routing array is comprised of a plurality of routing registers with each register transferring information to and from a respective processing element of array 23–1 and to and from a respective memory unit of memory bank 28–1. In addition, the routing registers of the routing array 33–1 are operable to transfer information to neighboring or other selected routing registers within the segment or to the routing registers of preselected other segments. In a preferred embodiment, information utilized in the segments is first entered into the respective segments via line 35. This information placed in the routing array 33–1 may subsequently be transferred to the respective locations in the memory bank 28–1 by means of proper address designation and segment designation signals in line 40 communicative with the input-output control 38. The results of various operations are conveyed to the input/output control means 38 also along line 35. The routing array 33–1 therefore is the distributor of information for a particular segment. The routing array 33–1 will be described subsequently with respect to FIG. 4 and a routing register will be described with respect to FIG. 6.

In one operating condition, the processing elements, routing array and memory bank of each segment respectively receive the identical control signals and perform in an identical manner as the corresponding processing elements, routing arrays and memory banks of the other segments of the computer system. This operation is accomplished by each segment sequencer providing identical control signals in response to instructions provided by a central control means 44 including a central control unit 45 and a central control memory 46. Identical control signals will be provided in each segment by virtue of the fact that identical instructions are provided on line 49 to each sequencer, said instructions being stored in the central control memory 46 and thereafter transmitted simultaneously to all the sequencers by means of the central control unit 45.

When one or more segments, for example segment 1, is operated independently of the other segments, its sequencer 20–1 receives instructions stored in the associated memory bank 28–1. The remaining sequencers receive their instructions from the central control means 44 so that the computer may be structured to provide not only a single large parallel network computer but in addition may be structured to provide a plurality of concurrently operating parallel network computers, one or more sequentially operating computers in conjunction with concurrently operating parallel computers, or a plurality of concurrently operating sequential computers. With such potential variations in operating structure the central control means functions to keep track of the various segments and the current structure of the computer to provide necessary control signals, and to provide proper control signals for the input/output control unit 38 which controls various output units for the output of information, and controls the input of information to the various segments. The central control means may, if desired, provide the sequencers with different sets of instructions, by selective addressing.

FIG. 2: PROCESSING ELEMENT ARRAY

Figure 2:
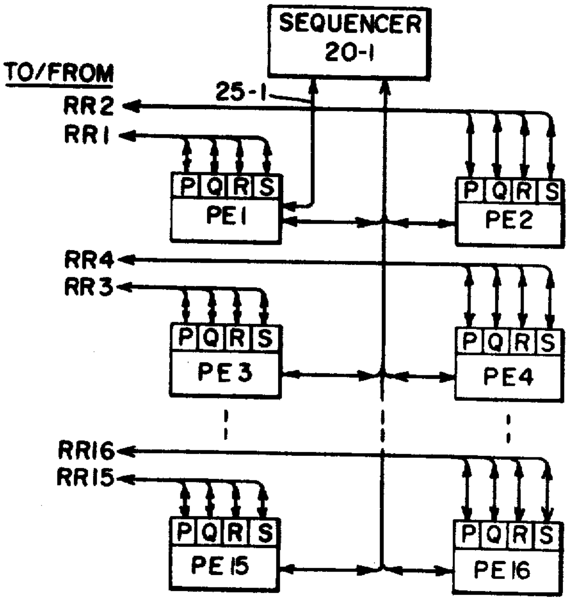
FIG. 2 illustrates the processing element array of FIG. 1 in somewhat more detail.

FIG. 2 illustrates, in conjunction with the sequencer 20–1 of FIG. 1, a somewhat more detailed showing of the processing element array 23–1. Sixteen processing elements are indicated, with each processing element including a plurality of registers P, Q, R and S. Information is transmitted to and from the processing elements from a respective routing register of the routing array 33–1 (FIG. 1) via a respective line labeled to/from RR1 to RR16. Registers P, Q, R or S first receive the data from a respective routing register, prior to a logic or arithmetic operation, and thereafter receive the result of the logic or arithmetic operation prior to the transmission back to their respectively connected routing register. Each of the processing elements receives control signals from, and is communicative with, the sequencer 20–1. In general, sequencer 20–1 provides similar control signals to each processing element so that they simultaneously perform the same operation. Each processing element however, has internal control means so that if certain predetermined conditions are met the processing element may be made non-responsive to a particular set of sequencer instructions.

When the segment is operating independently as a sequential type computer, one processing element of the array may be singled out to perform all the logic and arithmetic operations. The processing element chosen may have more complex circuitry and operate at greater speed than the remaining processing elements and accordingly may be provided with special control signals from the sequencer 20–1. Such a processing element is illustrated as processing element 1 receiving special control signals via line 25–1. When operating as a sequential computer the present invention provides that the P, Q, R and S registers of the remaining processing elements coopearte in a manner to serve as a fast access memory for the storage of information for processing element 1. Where the operating condition is one whereby all processing elements are to perform identical operations, the signals provided on line 25–1 may instruct processing element 1 to perform the operations being performed by processing elements 2 to 16 and if operating at greater speeds processing element 1 may complete its designated task and may be designed to wait for the completion of the same task by the remaining processing elements 2 to 16.

FIG. 3: MEMORY BANK

The memory bank 28–1 is comprised of a plurality of units in an array similar to the processing element array. Unit 1 which is typical of all the units includes means for storing information such means for example being a multibit-multiword core storage memory, memory 1, the words of which are addressable by means of a word selection logic circuit 54 in response to control signals from the sequencer 20–1, and for certain operations by proper designation signals on line 40. A selected word readout of the memory is transferred to a buffer in the form of memory output register 57 and conversely words to be written into the memory are first received by the register 57.

Each of the memories 1 to 16 is for the storage of information in the form of data and instructions. Accordingly, each of the memory output registers is communicative with a respective routing register, as indicated, for transferring data to be used in logic and arithmetic operations. In addition, each memory output register is communicative with the sequencer 20–1 for transferring stored instructions during one operating condition of the computer. Each memory output register is connected to a respective register in sequencer 20–1 so that a set of sixteen different instructions may be transferred in response to a single command.

FIG. 4: ROUTING ARRAY

Figure 3:
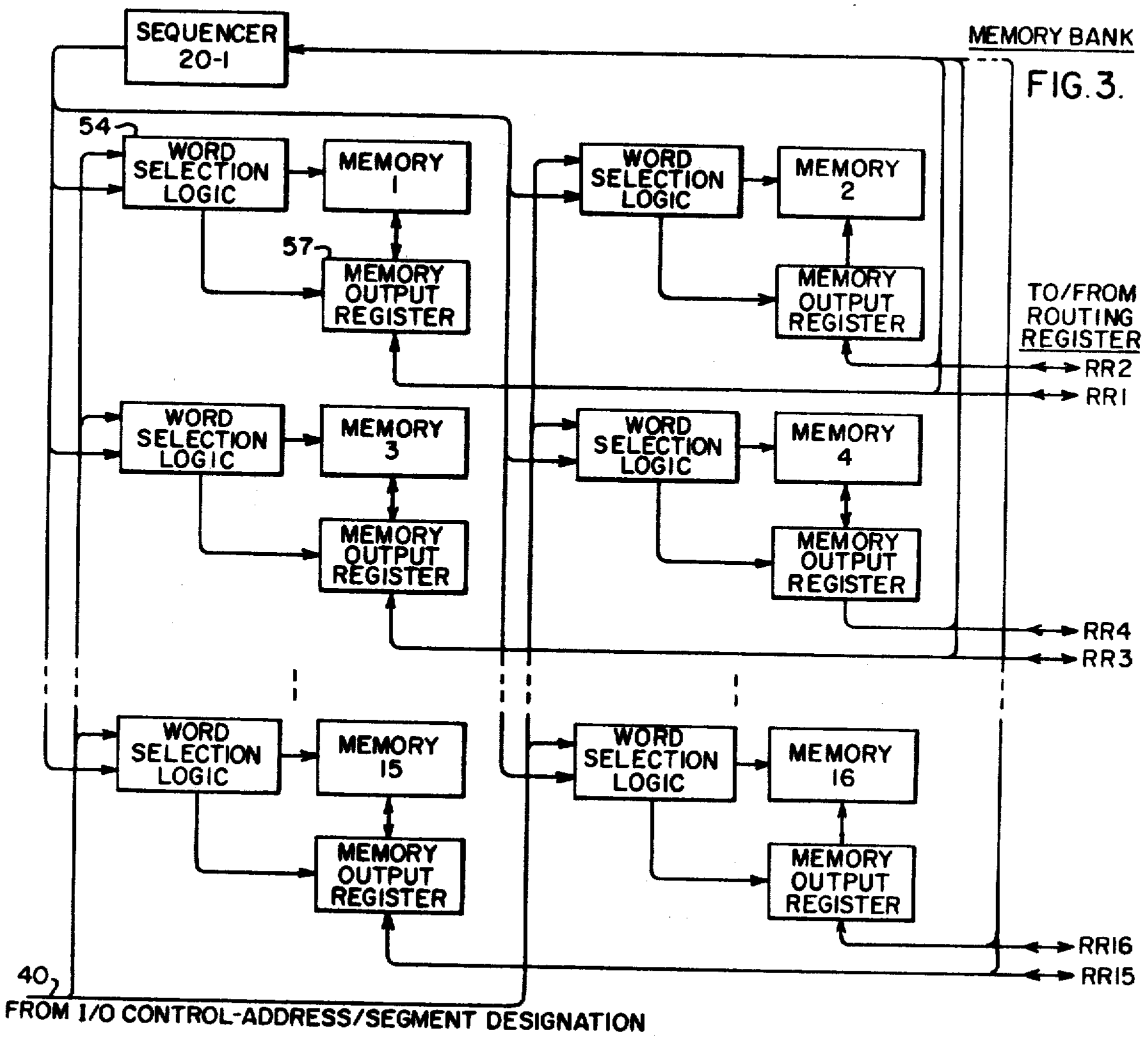
FIG. 3 illustrates in block diagram form a typical memory bank of FIG. 1.

The routing array 33–1 is comprised of a plurality of routing registers 1 to 16 arranged in the same orientation as the processing elements of FIG. 2 and the memory units of FIG. 3. The same array is chosen in order that each routing register be assigned to transfer information with one particular processing element of the processing element array and with one particular memory output register (FIG. 3) of the memory units. Information is transmitted to, and received from, the processing element array along respective lines designated to/from PE2, PE1, PE4, PE3, etc. on the right side of FIG. 4 and information is transmitted to, and received from, the memory output registers along the lines designated to/from MOR2, MOR1, MOR4, MOR3, etc. on the left side of FIG. 4.

Figure 4:
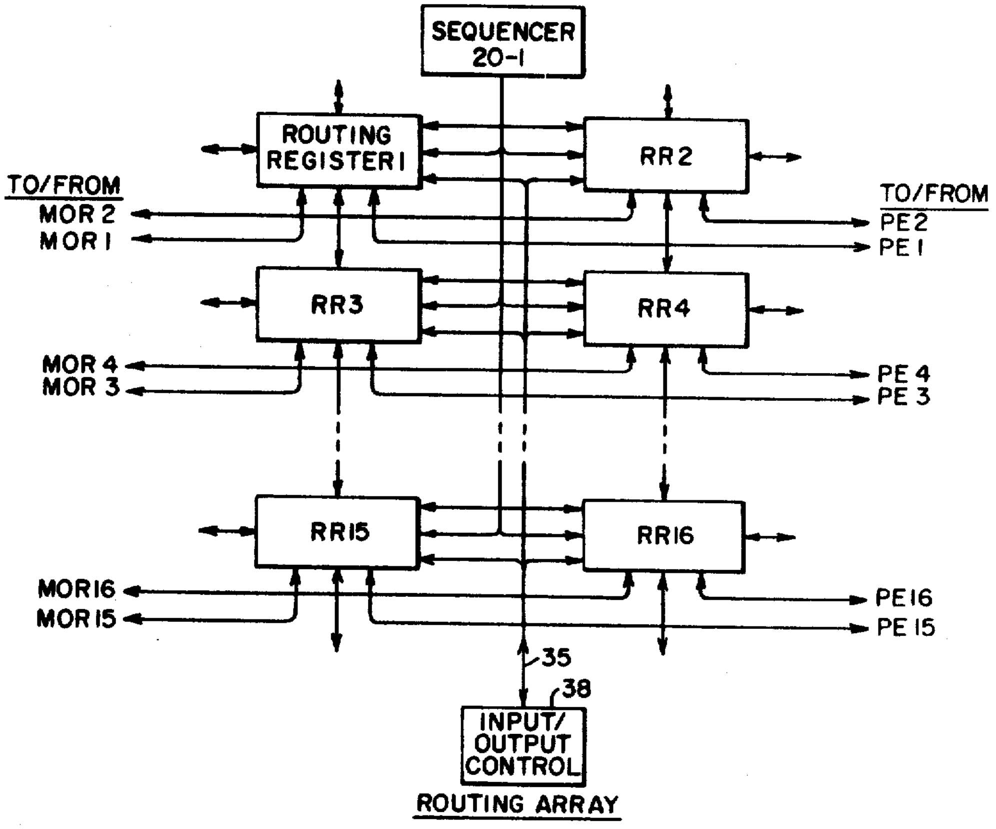
FIG. 4 illustrates in block diagram form the routing registers of a typical routing means of FIG. 1.

Each of the routing registers is operable to transfer its contents to other routing registers of the array and FIG. 4 illustrates by way of example, that each routing register is in information transfer relationship with its nearest neighbor routing register, that is, routing register 1 can transmit and receive information from routing register 2 (and vice versa) and can transmit and receive information from routing register 3 (and vice versa). In response to a command from sequencer 20–1 each routing register will transmit information in the same direction as the other routing registers of the array. If the command is to shift west, even routing registers 2, 4 . . . 16 will transfer their contents to respective odd routing registers 1, 3 . . . 15, and vice versa with a shift east command. In a similar manner, the routing registers can transfer data in the same column by means of north and south shift commands. As will be explained with respect to FIGS. 5, 6 and 7 the information transmitted west by odd routing registers 1, 3 . . . 15, east by even routing registers 2, 4 . . . 16, north by routing registers 1 and 2, and south by routing registers 15 and 16 may be received by the routing registers within that particular segment or by the routing registers of preselected other segments.

The routing registers operate as the prime receiver and disperser of information within the segment and accordingly information to be stored in respective memory units (FIG. 3) are first received by the respective routing registers 1 to 16 on line 35 from the input/output control means 38. The results of computations or the solution to problems are transmitted to the input/output control means 38 along line 35 subsequent to the placement of such information in the respective routing registers.

FIG. 5: ROUTING REGISTER INFORMATION TRANSFERS

Figure 5:
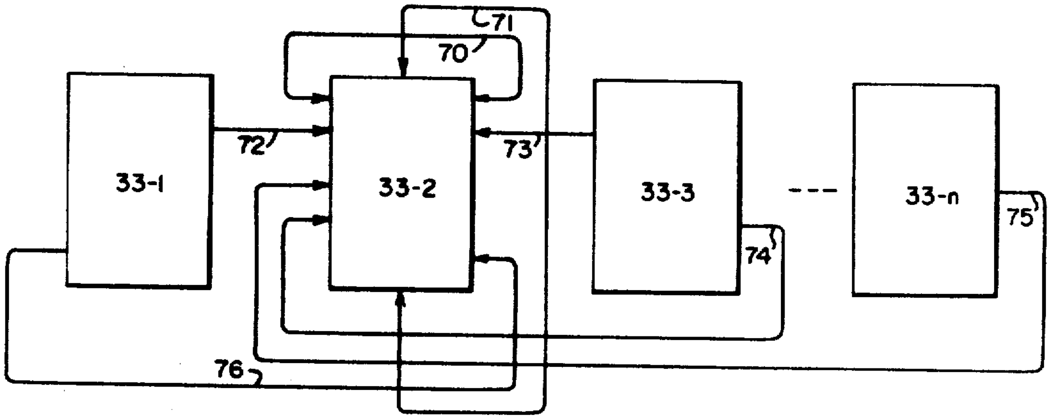
FIG. 5 illustrates a typical data transfer between routing registers of different segments.

Each of the rectangular blocks 33–1 to **33–*n* of FIG. 5 represents a typical routing register array such as in FIG. 4 however, for clarity the individual routing registers and connecting lines have been omitted. FIG. 5 illustrates by way of example some of the possible connections that may be made for information transfer within a particular segment and for information transfer between segments. Within the segment, line 70 indicates that the odd numbered routing registers may transfer information to the even numbered routing registers within a segment (and vice versa) and line 71 indicates, for a north or south shift command that routing registers 1 and 2 may transfer their contents to routing registers 15 and 16** respectively (and vice versa).

Figure 6:
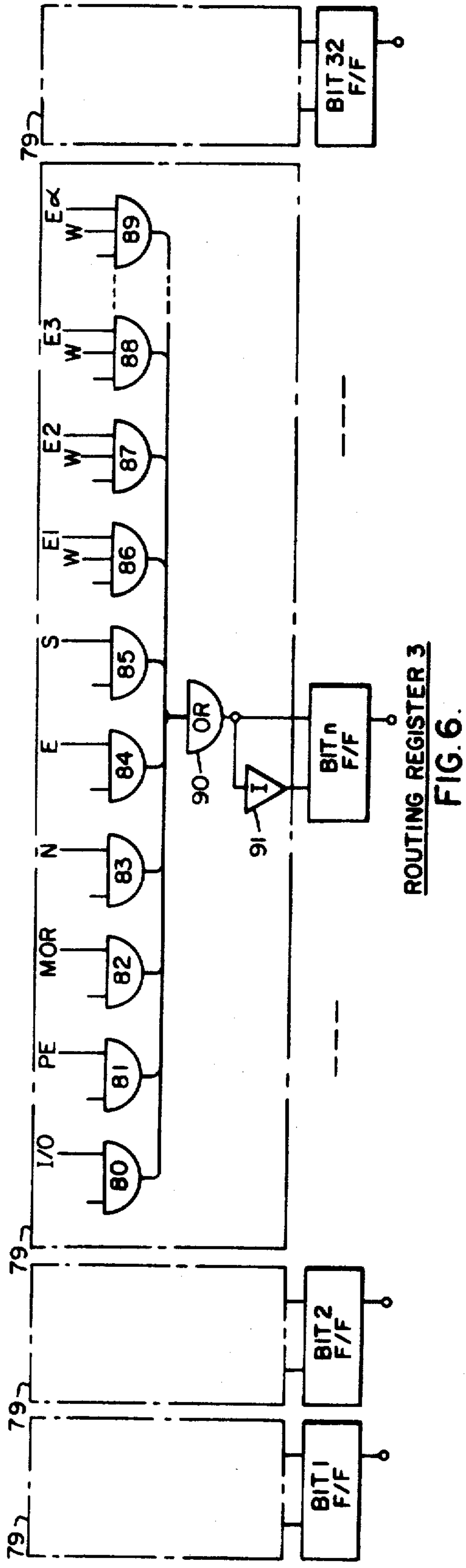
FIG. 6 illustrates in more detail a typical routing register of FIG. 4.
Figure 7:
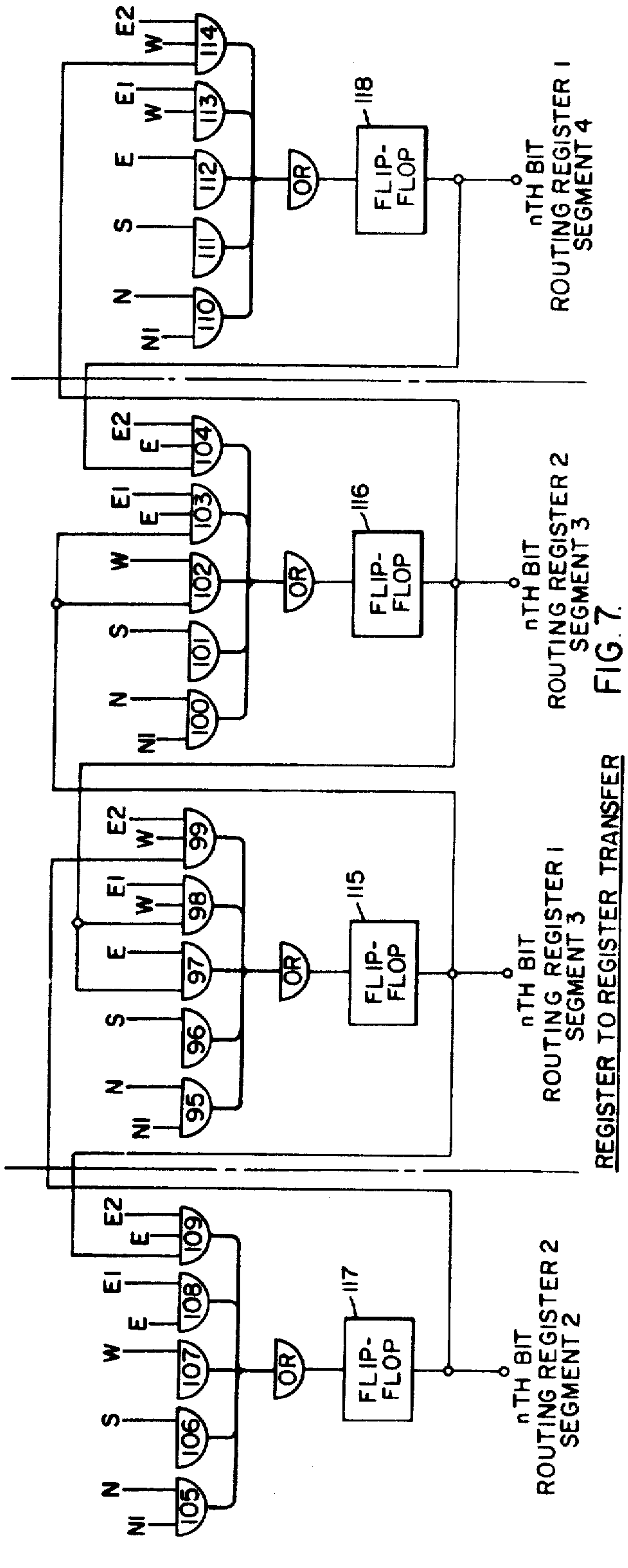
FIG. 7 illustrates, in logic circuit form, a portion of several routing registers, demonstrating information transfers.

Line 72 illustrates a transfer of information from the even numbered routing registers of one segment to the odd numbered routing registers of an adjacent segment and line 73 illustrates the transfer from the odd numbered routing registers of one segment to the even numbered routing registers of an adjacent segment. Line 74 illustrates an eastward shift to the odd numbered routing registers of a west adjacent segment and line 75 illustrates an eastward shift to the odd numbered routing registers two west segments away. As another example, line 76 illustrates a westward shift of information to the even numbered routing registers of an east adjacent segment. The shift of information as illustrated in FIG. 5 is accomplished by proper control signals provided to the particular routing registers as illustrated in FIGS. 6 and 7.

FIG. 6: LOGIC ARRANGEMENT OF ROUTING REGISTER

The logic arangement of routing register 3 (FIG. 4) is illustrated by way of example.

In the subject computer system a typical information word, either data or an instruction, is comprised of a plurality of bits, 32 bits being exemplary. The routing register accordingly contains 32 flip-flops, one for each bit, the flip-flops being designated bit 1F/F, bit 2F/F, etc. Associated with each flip-flop is an input gating means 79 for causing its associated flip-flop to assume one of its two stable states, depending upon the information received. A typical gating means for the bit *n* flip-flop is illustrated and includes a plurality of AND gates 80 to 89 each of which has an output connected to an input of OR gate 90 which if provided with an input signal from any one of the AND gates 80 to 89 will provide a corresponding output signal to set the bit *n* flip-flop. If no output signal is provided by OR gate 90 an output signal will in turn be provided by the inverter gate 91 to place the bit *n* flip-flop into a reset condition.

Each of the AND gates 80 to 89 has one or more control signals provided to it from the sequencer 20–1 (FIG.

4). In addition, each AND gate is seen to include an unlabeled input. This unlabeled input receives the *n*th information bit from a corresponding other unit of the computer. If it is desired to input information into the register from the input/output control means 38 (FIG. 4) the input/output signal is provided to AND gate 80 which is then enabled such that if the *n*th information bit on the unlabeled input lead of AND gate 80 is a one, an output signal will be provided which causes the setting of the bit *n* flip-flop, indicative of a one, the input signal. If the *n*th information bit is a zero, no output signal will be provided by AND gate 80 and the bit *n* flip-flop will be placed into a reset condition indicative of the zero input. When it is desired to input information from a processing element, the PE signal to AND gate 81 is provided since the unlabeled input to AND gate 81 is connected to the output of a bit *n* flip-flop in processing element 3 (it will be remembered that routing register 3 is being described).

The information bit to AND gate 81 is provided by one flip-flop of one register in the corresponding processing element 3. The processing elements contain a plurality of registers (P, Q, R and S); it is apparent that additional AND gates may be provided for selective receipt of information from these other processing element registers.

For input of information from the memory units, more specifically the memory output registers (FIG. 3) the MOR signal to AND gate 82 is provided to set or reset the bit *n* flip-flop in accordance with the *n*th information bit from the memory output register of memory 3.

Each of the routing registers has the capability of transferring information to other routing registers within the array. In the example illustrated, each routing register may communicate with its nearest neighbor. Accordingly if it is desired to receive information from routing register 1, the N signal (indicating that the information is coming from the north) is provided to AND gate 83. If the information from routing register 4, that is from the east, is desired, the E signal to AND gate 84 is energized and if information from routing register 5 (not illustrated in FIG. 4) is desired, the S signal to AND gate 85 is provided.

In the computer operating condition where a segment is operating independently of the remainder of the system is may be required that the odd numbered routing registers exchange information with the even numbered routing registers. For a shift right, routing register 4 may receive information from its neighbor to the west (routing register 3) and routing register 3 may receive information from routing register 4 by means of AND gate 86 having applied thereto two control signals, W and E1, the unmarked input being connected to the bit *n* output of routing register 4.

The routing registers of a particular segment additionally possess the capability of being able to transfer information to the routing registers of other segments. The remaining AND gates 87, 88 and 89 illustrate various control signals for input of information from preselected other routing registers of the entire computer system. The E $\alpha$ control signal to AND gate 89 is utilized to designate that a plurality of other gates for receipt of other edge conditions may be provided.

An example of an internal information transfer and a segment to segment information transfer is illustrated in the following FIG. 7.

FIG. 7: ROUTING REGISTER INFORMATION TRANSFER

FIG. 7 illustrates a simplified logic diagram of the gating means for setting the bit *n* flip-flop of four routing registers, namely routing registers 1 and 2 (FIG. 4) of one segment such as segment 3, and the left and right adjacent routing registers, that is, routing register 2 of segment 2, and routing register 1 of segment 4, AND gates 95 to 99 are similar to AND gates 83 to 87 of FIG. 6, and for clarity the remaining gates have been omitted. The AND gates provide their outputs to an OR gate which sets or resets a flip-flop 115 the output of which is designated "*n*th bit, routing register 1, segment 3." In a similar manner AND gates 100 to 104 are located in routing register 2 set or reset a flip-flop 116 the output of which is designated "*n*th bit, routing register 2, segment 3." AND gates 105 to 109 are in routing register 2 of an adjacent segment and they function to set or reset flip-flop 117 the output of which has been designated "*n*th bit, routing register 2, segment 2." The remaining AND gates 110 to 114 are in routing register 1 of another adjacent segment and they serve to set or reset flip-flop 118 the output of which is designated "*n*th bit, routing register 1, segment 4."

Within segment 3, the output of flip-flop 115 is connected to AND gates 102 and 103 and the output of flip-flop 116 is connected to AND gates 97 and 98. These wired connections, in conjunction with proper control signals, allow transfer of information upon a shift east or shift west command. By way of example, if information is to be shifted west, the E and E1 signals are provided to all the routing registers. The E signal to AND gate 97 allows the output of flip-flop 116 to be transferred to place flip-flop 115 into a like state. The E1 signal applied to AND gate 98 has no effect since the W signal has not ben provided. The E and E1 signals provided to AND gate 103 allows the output of flip-flop 115 to control the state of flip-flop 116. Thus upon a single command, the state of flip-flop 116 has been transferred to flip-flop 115 and vice versa. Simultaneously, this same operation occurs with every other flip-flop in the routing registers such that the contents of the entire registers are transferred.

For a transfer wherein the routing registers are to receive information from their respective western neighbors, the W and E2 signals may be provided to the routing registers of the various segments. With the W and E2 signals provided to AND gate 99, the other input signal, from the output of flip-flop 117, will cause flip-flop 115 to be set or reset accordingly. Since a W signal is provided to AND gate 102, the output of flip-flop 115 forming the other input to AND gate 102 will cause flip-flop 116 to be set or reset accordingly. The E2 signal provided to AND gate 104 does not effect its output since the other E signal to it is not being provided. The output of AND gate 116 is fed to AND gate 114 which receives the W and E2 signals to thereby cause the setting or resetting of flip-flop 118.

The routing registers are also wired for a westward shift whereby each routing register receives information from its eastmost nearest neighbor. The E and E2 signals are provided to the routing registers. AND gate 109 receiving the output of flip-flop 115, the E and E2 control signals, will control the output of flip-flop 117 accordingly. The E signal to AND gate 97 will control the state of flip-flop 115 in accordance with the other input from flip-flop 116. AND gate 99 although receiving an E2 signal does not receive a W signal to provide an output. The E and E2 signals to AND gate 104 allows the other input, from flip-flop 118, to control the output of flip-flop 116.

By connections similar to those described, additional AND gates may be provided, receiving other edge control signals to govern its associated flip-flop output in accordance with the registers of other segments such as described with respect to FIG. 5.

In many problems it is necessary to transfer information in a north or south direction. In such cases it may be desired that the routing registers transfer as illustrated by line 71 of FIG. 5, that is for a northern shift routing registers 1 and 2 (FIG. 4) will transmit information to routing registers 15 and 16 and for southern shift routing registers 15 and 16 will transmit information to routing registers 1 and 2. In FIG. 7 it is seen that the routing registers 1 and 2 of the various segments contain an AND gate which receives an N control signal. These AND gates may additionally receive an N1 control signal for controlling the internal transfers (the remaining routing registers 3 to 15 of an array would not have the N1 control input). In a similar fashion if each routing register is to receive information from the south, routing registers 15 and 16 of the various segments may have an additional control signal to the AND gate receiving the S control signal.

A processing element can be a relatively simple unit for performing a logic step in, for example, a pattern recognition problem, or it can be a highly complex circuit capable of performing a full repertoire of logic and arithmetic operations including fixed of floating point arithmetic operations and may additionally have circuit means such that the processing element will be nonresponsive to certain commands.

FIG. 8: PROCESSING ELEMENT

Figure 8:
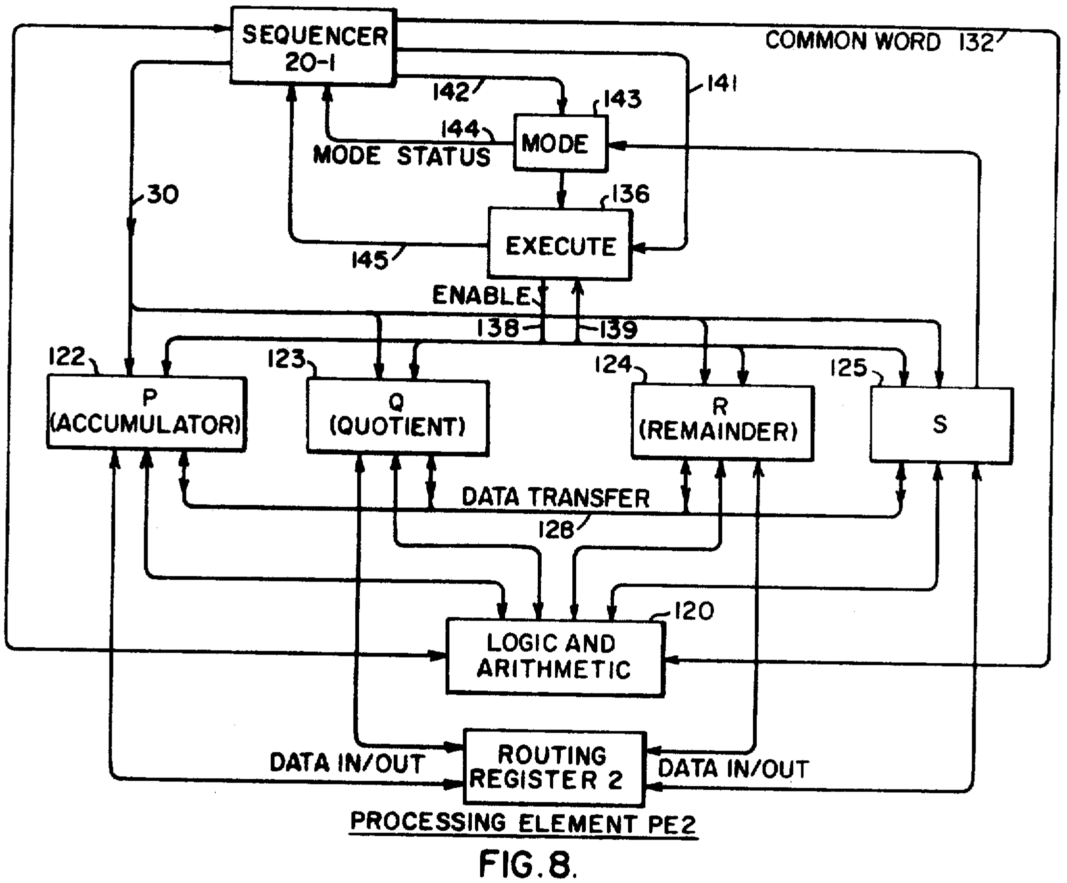
FIG. 8 illustrates in block diagram form the internal structure of one type of processing element which may be utilized herein.

FIG. 8 shows an embodiment of a preferred typical processing element, processing element 2 being exemplary. The processing element includes a logic and arithmetic circuit 120 for performing various logic and arithmetic operations upon data provided to the processing element. The data upon which operations are to be performed are supplied to the processing element from routing register 2, and the results of various logic and arithmetic operations are transmitted from the processing element to routing register 2 where the results may then be shifted to another routing register (FIG. 4), placed in an associated memory unit (FIG. 3) or may be output into the input/output control means 38 (FIG. 1).

For input of information from routing register 2, the information may be selectively placed in one or more registers illustrated as the P register 122 which may serve as an accumulator register, the Q register 123 which may serve as a quotient register for multiplication operations, the R register 124 which may serve as a remainder register for division operations, and the S register 125 which may serve as a buffer or storage register. Each of these registers is operable to transfer and receive data from other ones of the registers as indicated by the data transfer line 128. The registers 122 to 125 are preferably fast operating flip-flop registers selectively addressable by means of selection signals provided by sequencer 20–1 along particular leads in selection line 30.

The solution to a great number of mathematical problems requires the use of a constant for example $\pi$, the speed of light, etc. or the use of some other recurring number. In many instances several constants may enter into the solution of a particular problem. Since in one computer operating condition the processing elements are all performing in an identical manner, it is required that the constant or constants be previously stored in the sixteen associated memories (FIG. 3). In order to eliminate the time for loading the constants into the memories and to conserve the memory requirements, the sequencer 20–1 may be operable to store the constant or constants and, upon command, provide it or them to all of the processing elements simultaneously. This is illustrated in FIG. 8 by means of the common word line 132 communicative between the sequencer 20–1 and the logic and arithmetic circuit 120. This latter concept is the subject matter of, and explained in more detail in, U.S. Pat. 3,312,943, McKindles et al. issued Apr. 4, 1967.

All of the processing elements receive control signals indicating the same operaion to be performed. In the computer system described herein it is desirable that the processing elements be able to alter the received commands such as by being non-responsive to them. Accordingly, the processing element is provided with an execute circuit 136 which if certain predetermined conditions are met will enable the processing element by providing an enable signal on the enable line 138 to, by way of example, the registers 122 to 125. The execute circuit 136 is also operable to receive the results of any logic or arithmetic operations which are stored in the registers 122 to 125 by means of the test line 139.

The processing elements are arranged in a plurality of rows forming two columns. The sequencer 20–1 is operable to selectively provide a row and column selection signal along the line 141 to the execute circuit 136 and is additionally operable to provide one or more mode selection signals on line 142 to the mode circuit 143. Very basically, the mode circuit 143 may include one or more flip-flops with each different combined output of the states of the flip-flops representing a different mode status. For example, with two flip-flops if both are reset, a mode 1 status is represented. If the first is set and the second reset, a mode 2 status is represented. If the second is set and the first is reset, a mode 3 status is represented and if both are set, a mode 4 status is represented. The flip-flops may be set to represent a particular mode status by means of the information in register 125. This information may be from a memory unit via routing register 2, may be the result of a logic or arithmetic operation or may be from register 122, 123 or 124, by way of example. If the mode signals provided on line 142 correspond to the mode status represented by the states of the two flip-flops and if the proper row and column signals are provided on line 141, then an enable signal will be provided on line 138. For all processing elements receiving a row and column signal to be responsive to the commands of the sequencer 20–1, the mode signals on line 41, 142 may correspond to every possible mode status. The row-column select scheme is the subject matter of U.S. Pat. 3,308,436, Borck et al., issued Mar. 7, 1967 and the mode select scheme is the subject matter of U.S. Pat. 3,287,702, Borck et al., issued Nov. 22, 1966.

The mode circuit 143 and the execute circuit 136 are operable to provide respective signals to the sequencer 20–1 along the lines 144 and 145 to indicate to the sequencer which mode the processing element is in and whether or not an enable signal has been provided.

Each of the processing elements of the array may be identical in structure, however, as indicated in FIG. 1 and FIG. 2, processing element 1 may receive special signals from the sequencer 20–1 along the line 25–1. Accordingly, processing element 1 may be of a more complex nature than the remaining processing element and although operable to perform the same functions, will perform them at a much greater rate of speed. This capability is useful for an operation to be described with respect to FIG. 11.

FIG. 9: SEQUENCER

The sequencer is the unit which may control all the functions within its associated segment. The sequencer (see FIG. 1) is operable to provide arithmetic and logic commands to the processing element array 23–1, is operable to provide routing commands to the routing array 33–1, the processing element array 23–1 and the memory bank 28–1 for effecting information transfers, and is operable to provide memory access commands to the memory bank 28–1. The commands are provided in response to instructions stored in the instruction queue 150. The instruction queue 150 is a storage means which comprises a plurality of storage locations in the form of registers R1 to R16 each for the storage of a single instruction and each being connected to a respective memory output register (FIG. 3) via the lines labeled "from MOR1, MOR2, etc."

In operation, a previously known program is separated into a plurality of instruction groups and the groups are loaded into respective ones of the sixteen memories of FIG. 3. When the instruction queue 150 is to be loaded from the memories an instruction is provided such that one stored instruction from each memory is transferred to the respective memory output registers and when the gating means 153 of the instruction queue 150 receives the proper control signal, the sixteen new instructions will be loaded concurrently into the respective registers R1 to R16. The instruction queue may be expanded to accommodate more instructions such as by successive loadings from the memories.

In another type of operation, as a parallel network type computer, all of the segments will be performing the same operation and accordingly the instructions forming a program may be stored in the central control memory 46 of FIG. 1. These instructions, 16 at a time, may then be transferred to the instruction queue 150 (of each segment) by a suitable control signal to gating means 154, the instructions being provided to respective registers R1 to R16 via the line designated "load from Central Control."

Instructions in the instruction queue 150 are transferred one at a time to an instruction register 156. Thereafter the instruction is carried out and the next instruction transferred to the instruction register 156.

Each instruction is comprised of two parts. The first part is an instruction field indicating what particular operation is to be performed, and the other part of the instruction contains information such as data, address information, index information, etc. The instruction field may designate one of a plurality of commands, namely an arithmetic command, a routing command, a memory access command and a command for controlling the sequencer itself. Accordingly, a partial decode circuit 158 senses the instruction field within the register 156 and provides the necessary and proper output signals to the arithmetic control circuit 160, the routing control circuit 161, the memory access control circuit 162 or the sequencer control circuit 163. In a well known manner, the control circuits 160 to 163 are responsive to respective outputs from the partial decode circuit 158 to provide the necessary operation signals for carrying out the designated instruction.

Associated with each control circuit 161 to 163 is a respective control logic circuit 166 to 168 and associated with the arithmetic control circuit 169 is a control and signal sequence logic circuit 169.

In response to an arithmetic command, the arithmetic control circuit 160 provides arithmetic operation signals on line 172. The signals are sensed by the control and signal sequence logic circuit 169 which also receives the remaining field of the instruction to generate a sequence of signals for controlling operations within the processing element and including the provision of a mode selection signal on line 142' (becomes line 142 at each processing element, see FIG. 8). In the embodiment where processing element 1 is a fast operating special computer, it may be responsive to the operation signals for generating its own sequence signals at faster rates. The processing element 1 is also provided with a mode selection signal, the operation and mode signals being provided to processing element 1 by line 25–1 (also shown in FIGS. 1 and 2).

In response to a routing command, the routing control circuit 161 provides operation signals on line 174 for providing a selected input/output, PE, MOR, N, E, W or S signals (see FIG. 6) to the routing registers. The control logic circuit 166 receives the operation signals, the remaining portion of the instruction, and information along line 176 relative to the computer configuration, to provide signals indicating for example the data transfer between selective segments such as E1, E2 . . . E$\alpha$ signals of FIG. 6 or multiple shifts such as $x$ places west (or east) and $y$ places north (or south).

In response to a memory command, the memory access control circuit 162 provides operation signals on line 178 indicating a read, write or execute operation, for example, and the control logic circuit 167 receives the operation signals and the remaining portion of the instruction for generating such control signals to designate the address in memory where the information is to be retrieved or stored.

Associated with each sequencer is a plurality of registers indicated as the column and row geometric control registers 183 and 184, the common word register 185 and the configuration control register 186. In addition, there is provided, in order to do indexing operations, index circuits 187. The column geometric control register 183 provides a two bit output to the processing elements, one bit being provided to all the odd numbered processing elements and the other bit being provided to all the even numbered processing elements (there are two columns in the array). The row geometric control register 184 provides an eight bit output, one bit being provided to the two processing elements of each row (there are 8 rows in the array). When the processing element receives the row and column bits, and if they are both ones for example, the processing element will be enabled, in conjunction with the proper mode signals, to carry out its operation. The output of registers 183 and 184 are provided on line 141' also shown in FIG. 8 as line 141 at the top right of the execute circuit 136.

The common word register as previously explained provides, for use in calculations, a constant along line 132 shown on the extreme right-hand portion of the processing element circuit of FIG. 8.

As was stated, an individual segment may be operating independently from the remainder of the computer system and this operating condition may represent one type of configuration. In another operation, particular data transfers between routing registers of the segments such as illustrated in FIG. 5 will have to be designated. In general the configuration control register 186 provides the necessary output signals on line 176 to indicate the configuration and operation to be assumed by the particular segment that the sequencer controls. The registers 183 to 187 may be selectively chosen by means of an operation signal on line 189 from the sequencer control circuit 163; the necessary data such as the selected two bits for the register 183, the eight bits for register 184, the constant for register 185 or the configuration code for register 186 is provided on line 191 from the control logic circuit 168. Indexing information for the index circuits 187 may be provided directly from the instruction register 156 on line 193.

It has been stated with respect to FIG. 1 that all of the processing elements of the entire computer system simulaneously may be commanded to perform the same operation. This is accomplished by loading the instruction queues of sequencers 20–1 to **20–*n* with identical programs supplied by the central control means 44 and when certain predetermined conditions exist, one or more of the segments may operate independently of the remainder of the system by being provided with instructions from its associated memory bank. In order to accomplish this operation, circuit means are provided to determine when independent operation is to occur. Accordingly, the program control circuit 200 is provided to accomplish this function by controlling the sequencer operation in response to information from the processing elements, information from the central control means, or both. One way of determining conditions of the processing elements may be to examine the output of the flip-flops of the mode control circuitry, which in turn may be set as the result of a certain calculation being equal to, greater than or less than a predetermined value. Another method by which the condition of a processing element may be determined is by examining the logic and arithmetic unit to see, for example if a result is zero, if there is an overflow, if there is a carry, etc. This communication with the processing elements is indicated by line 202 on the right side of the program control circuit 200. Included in line 202 would be lines 144 and 145** (FIG. 8) of each processing element.

Figure 9:
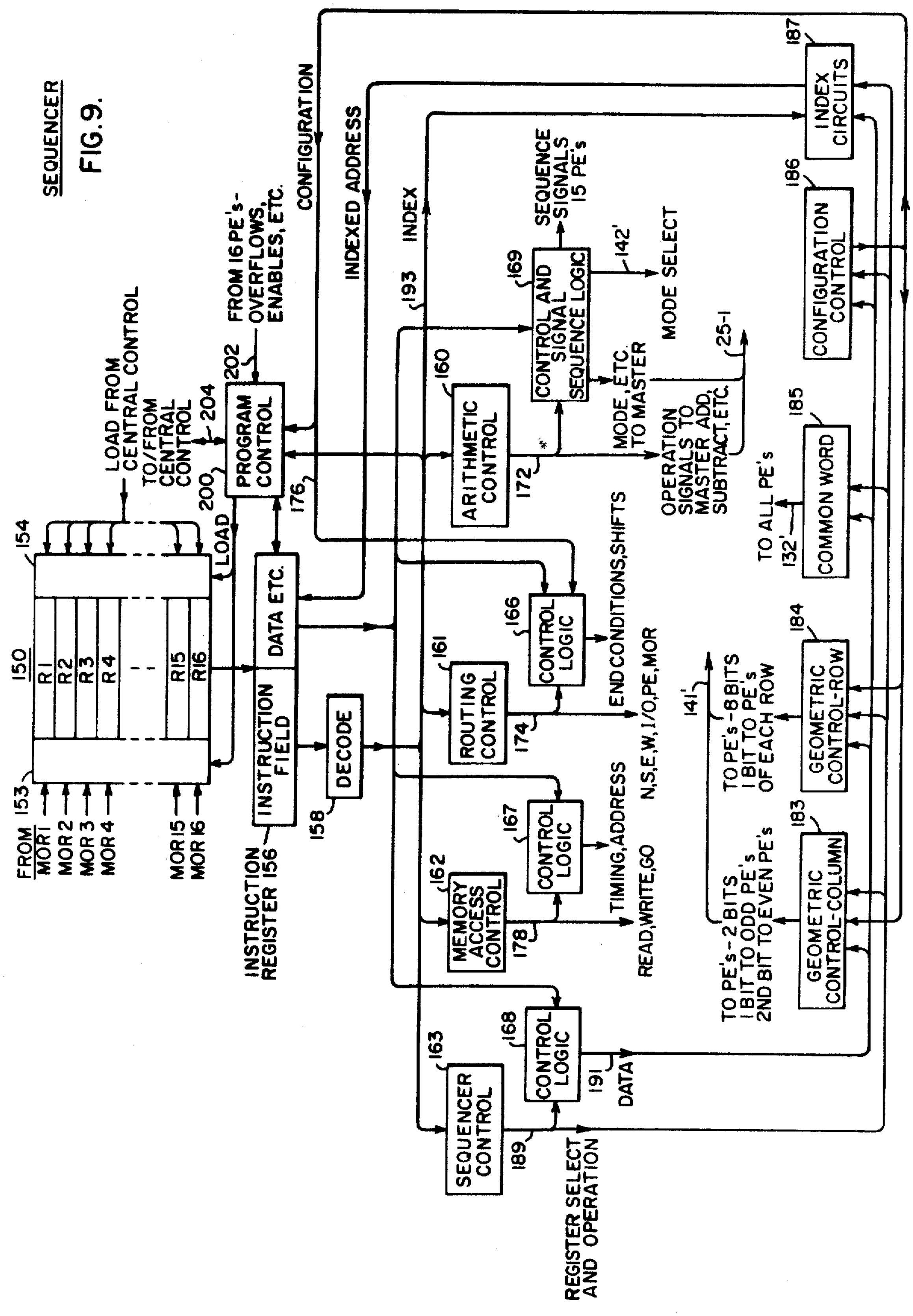
FIG. 9 illustrates a typical sequencer means of FIG. 1 in more detail.

The central control means 44 (FIG. 1) has the capability to interrupt and test the status of any segment of the computer system while it is in operation. Counter or clock computing means may be located in the central control unit 45 for predicting when a particular segment will be free in the future if presently engaged in a separate problem. Communication with the central control means 44 is also provided such that interruption of the sequencer operation may take place to allow the central control means to force a particular segment to respond to its commands or to allow the central control unit to alter the contents of the configuration control register 186. This communication between the sequencer and the central control means is illustrated in FIG. 9 by the line 204 at the top of the program control circuit 200.

The program control circuit 200 therefore is responsive to a command from the central control unit, the condition of the processing elements, the output of the configuration control register 186, and the instruction in the instruction register 156 to control, by way of example, whether gating means 153 or 154 is enabled for selective loading from the memories or from the central control. The program control circuit is also operable to skip or jump one or more of the instructions in the queue or to dump the instruction in the instruction register 156 or to dump one or more instructions in registers R1 to R16 of the instruction queue 150.

There are many ways by which the computer system may vary its structure while in operation. The following is merely by way of example. Let it be assumed that all of the segments are operating identically, simulating a parallel network computer wherein all of the processing elements receive the same command. With reference to FIGS. 1 and 9, under this type of operation instructions are gated into the instruction queue 150 through the gating means 154 under the direction of the program control circuit 200. At some point in the operation a set of instructions will be placed in the instruction queues of each of the sequencers indicating, for example, that a test of the mode circuit 143 (FIG. 8) is to be made to determine if the processing element is in mode 2, for example. If one or more of the processing elements indicate that this condition is met, then the next instruction in the sequence may be to alter the configuration. This latter instruction is partially decoded in the partial decode circuit 158 and the sequencer control circuit 163 then provides an input signal to configuration control register 186, the coded output signal of which is fed to the program control circuit 200. The remaining instructions may then be carried out or the program control circuit 200 may dump the remaining instructions and load a new set of instructions by enabling gating means 153 whereby the instruction queue 150 is loaded from the memory output registers (FIG. 3).

In the segments where the mode circuits 143 of the processing elements were tested and found not to meet the condition then its associated program control circuit 200 would have initiated a jump around those instructions which directed a configuration change. In a similar manner the now independently operating segment may at a certain point in its operation receive a set of instructions from the memory units to switch back to its prior operating condition whereby instructions were received from the central control. The switch will occur if the processing elements indicate that certain conditions are met, or a jump over that series of instructions will occur and independent operation will continue if the conditions are not met.

FIG. 10: LAPLACE EQUATION SOLUTION

In many mathematical problems involving partial differential equations it is required to find the solution of the Laplace equation $$\nabla^2 U(x, y) = 0 \qquad \text{(Eq. 1)}$$

This equation is encountered in such areas as numerical weather forecasting, nuclear reactor calculations, heat flow, stress, diffusion, and electrical problems, to name a few. In such problems there generally exists a body under examination having known boundary conditions. For instance, with respect to heat flow problems the known boundary conditions would be the temperature on the boundary of a body under examination and with respect to an electrical problem the boundary condition may represent an electric or magnetic field.

For purposes of numerical computation the Laplace problem may be approximated by providing a grid network over the body under examination with each intersection of the grid lines constituting a node point. The Laplace equation may be represented by the five point formula for the numerical solution at interior point in a mesh and is given as $$U = \frac{U_W + U_E + U_N + U_S}{4} \qquad \text{(Eq. 2)}$$

Figure 10:
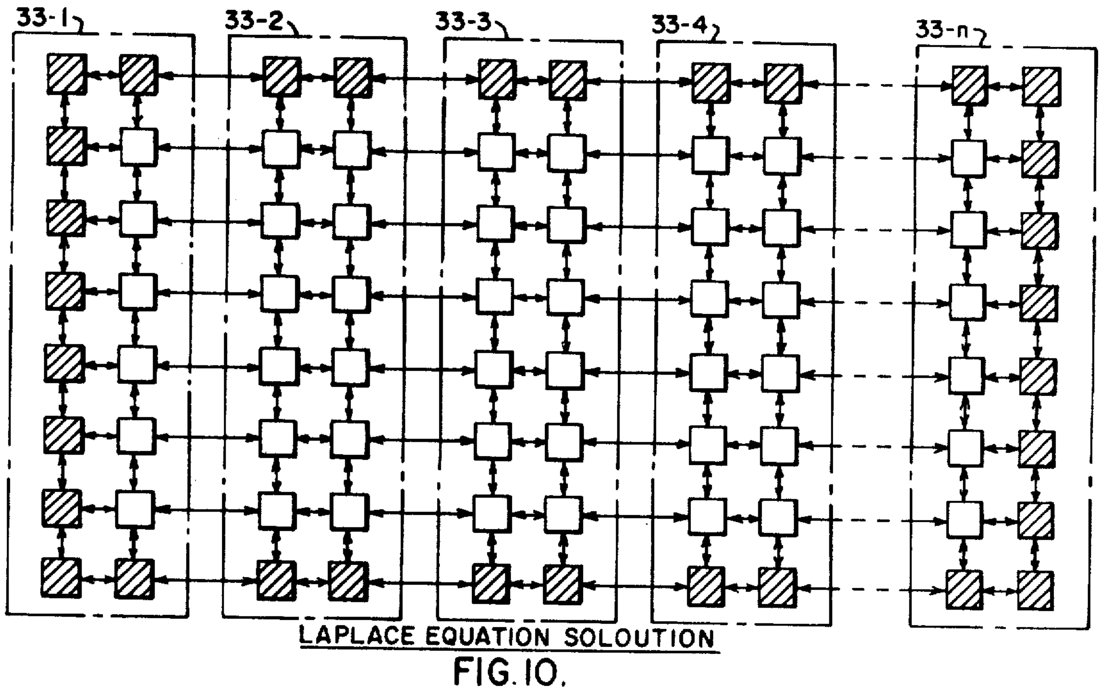
FIG. 10 illustrates an example of the use of the computer of FIG. 1 as a parallel network system.

With respect to a particular node point, the $U_W$ represents the value of a function at its west neighbor node point, $U_E$ at its east neighbor node point, $U_N$ at its north neighbor node point and $U_S$ at its south neighbor node point. The U represents the value of a function at the node point under consideration. FIG. 10 illustrates how the variable structure computer of the present invention operates in the solution of a Laplace equation in particular, the solution of Equation 2. Throughout the discussion of FIG. 10 reference will additionally be made to the processing element of FIG. 8.

In FIG. 10 there are illustrated routing arrays 33–1 to **33–*n*** with each small square representing the routing register in the array. It will be remembered that the routing array is identical to the processing array and each routing register is communicative with a corresponding individual processing element.

Each routing register may be thought of as occupying the position of a node point in a mesh with the hatched routing registers around the periphery of the figure representing a boundary having a constant value. Assuming for a moment that the array of FIG. 10 is a processing element array, the hatched blocks could represent processing elements that have been assigned mode 1 status while the unhatched blocks represent processing elements that have been assigned mode 2 status.

Initially, all of the memory units provide the routing registers with the values of the functions at the respective node points. That is, each routing register of FIG. 10 will be provided with a certain number (which may be positive, negative or zero) representing the function at a node point. Upon a command all of the routing registers will transfer their number to their associated processing element, and in particular to the P register 122. It is to be noted that the transfer does not destroy the number in the routing register but merely places that same number into the register to which it is transferred. The following sequence may be utilized and reiterated until a final solution is achieved. Basically, each node point obtains the average arithmetic value of its four nearest neighbors, and this value U is compared with a $U_0$, the U of a previous calculation. If the difference between U and $U_0$ at all node points is less than a predetermined constant then the computational portion of the problem is completed. If the difference is greater than the constant, the calculations are reiterated.

A typical solution may include the following commands:

Arithmetic command, mode 2 only: Add the contents of the P register (122) to zero and place the result in the Q register (123). This provides temporary storage for $U_0$.

Routing command, all modes: Shift east one register. This brings the value of $U_W$ to the node point under consideration.

Arithmetic command, mode 2: Clear the P register, put the contents of the routing register into the S register (125), add the contents of the S and P registers and store the results in the P register. This places the value of $U_W$ into the P register. At this point it is to be noted that the boundary conditions are still maintained with its original value since a boundary processing element in mode 1 is non-responsive to the arithmetic commands directed to mode 2 processing elements.

Routing command, all modes: Shift west two places. This brings the original $U_E$ to the node point under consideration.

Arithmetic command, mode 2: Transfer the contents of the routing register to the S register, add the contents of the P and S register and put the results in the P register. $U_W+U_E$ is now in the P register.

Routing command, all modes: Shift east one place and north one place. This brings original $U_S$ to the node point under consideration.

Arithmetic command, mode 2: Transfer the contents of the routing register to the S register, add the contents of the P and S registers and put the results in P.

$$U_W+U_E+U_S$$

is now located in the P register.

Routing command, all modes: Shift one place south. This brings original $U_N$ to the node point under consideration.

Arithmetic command, mode 2: Transfer the contents of the routing register to the S register, add the contents of the P and S registers and put the results in the P register. $U_W+U_E+U_S+U_N$ is now located in the P register.

Arithmetic command, mode 2: Shift the contents of the P register right by two bits. This is equivalent to a division by four, assuming binary numbers. At this point the P registers of all processing elements in mode 2 have a value equal to U (see Equation 2). None of the boundary processing elements have executed the arithmetic command so in their P registers they have the original boundary conditions. All the processing elements have the value of $U_0$ in the Q register as a result of the first step in this sequence. A test is now conducted to see if the numerical computations may be concluded.

Arithmetic command, mode 2: Subtract the contents of the Q register from the contents of the P register and store the results in the Q register. This places the difference between the new and old values of U into the Q register while maintaining the new value in the P register.

Arithmetic command, mode 2: Place the predetermined constant into the processing element (e.g. via line 132) and subtract the contents of the Q register from the constant and store the results in the Q register. This compares the value of the constant with the difference between the old and new U values and if the number in the Q register is positive it means that the constant was greater than the difference, and if negative, the difference greater than the constant.

Arithmetic command, mode 2: Transfer all the processing elements in mode 2 to mode 3 if the number in the Q register is positive.

Sequencer command, all modes: Test to see if any processing elements are in mode 2. If there are no processing elements remaining in mode 2 the calculations have been completed.

Sequencer command, all modes: If the results of the previous step indicate that there are processing elements still in mode 2 then place all those processing elements that have switched to mode 3 back to mode 2 and start over at step 1 of the sequence.

It may be seen that after the initial memory access for obtaining the initial value of the function at a node point, the sequence of steps leading up to a solution are carried out without any requirement of a memory access command. The described variable structure computer therefore may provide the solution to a Laplace type equation at speeds much faster than existing sequential or parallel network type computers. In addition, the structural arrangement of the computer significantly decreases the computation time by virtue of the fact that transfers between routing registers (routing commands) can take place simultaneously with the arithmetic operations (arithmetic commands) within the processing element so that the arithmetic commands and routing commands may be overlapped (memory commands can also be overlapped) and performed substantially simultaneously.

FIG. 11: SEQUENTIAL OPERATION

Figure 11:
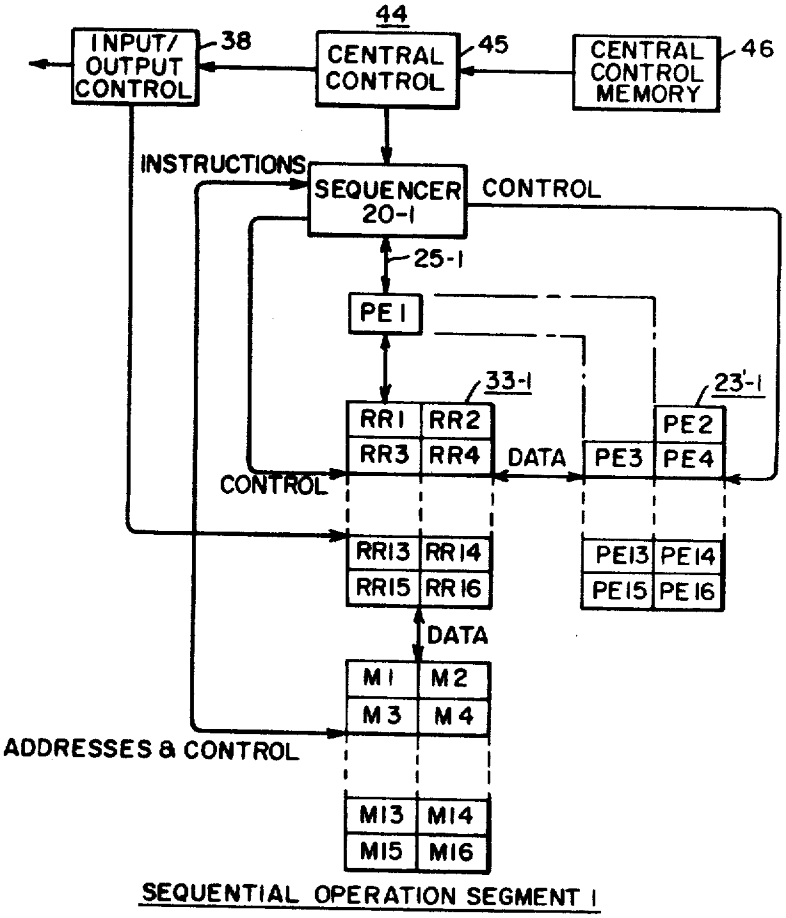
FIG. 11 illustrates the arrangement of a segment of FIG. 1 operating as a sequential computer.

When a segment operates independently of the other segments of the computer, its processing elements may receive control signals indicating that all the processing elements in that segment are to carry out the same arithmetic command, that is, the segment operates as a smaller parallel network computer. FIG. 11 illustrates yet another structural variation of the computer wherein an independently operating segment takes on the configuration of a sequential type machine which has only one logic and arithmetic section. In discussing FIG. 11 reference should also be made to FIG. 1 for correspondingly similar reference numerals.

In the sequential mode, processing element 1 is chosen as the single processing element to carry out all logic and arithmetic operations concerned with the solution of a particular problem. Taking segment 1 by way of example, FIG. 11 illustrates the sequencer 20–1 providing control signals along line 25–1 to processing element 1. The remaining 15 processing elements (PE2 to PE16) each include four registers P, Q, R and S which are utilized as a fast access or scratchpad memory for storing data utilized by processing element 1. The array of processing elements 2 to 16 have been given the primed designation 23′–1. Prior to operation in the sequential configuration, processing element 1 may be placed into mode 1 status while the remaining processing elements may be placed into mode 2 status such that processing element 1 is responsive to a first set of control signals whereas the remaining processing elements are only responsive to a second set of control signals.

The input/output control means 38 under direction of the central control means 44 is utilized to input and output information from the sequential machine. The memory bank 28–1 may be addressed for supplying data to the respective routing registers of the routing array 33–1, and the data may thereafter be placed into one of the P, Q, R or S registers of the processing elements 2 to 16 for storage. Thereafter by a series of routing register shift the data may be placed in routing register 1 for transfer to processing element 1.

The memory bank 28–1 is also used, as previously described, for supplying sets of instructions to the seqencer 20–1.

FIG. 12: PIPELINE COMPUTER SYSTEM

The variable structure computer described herein is extremely useful in operation as a pipeline computer system.

A pipeline computer system, also known by other names such as streaming processor, basically is a concept whereby a large quantity of arithmetic units are utilized in the solution of a problem which involves various arithmetic operations. The solution to a problem is broken up into a plurality of sub-solutions. Each sub-solution is performed at a respective station of a series of stations and each station performs only that sub-solution assigned to it. By way of a simple example, in the solution of the problem $Z=(A+B)\times C/D$ a first station performs the summation of $A+B$ and transfers the result to a second station which multiplies the result by C. At the same time that the multiplication is being carried out a new $A+B$ is being performed by the first station. The result of the multiplication of the second station is passed onto a third station where division by D takes place, the output of the third station being the desired result Z. In the variable structure computer described herein a segment may be analogized to a station where a sub-solution is performed.

Figures 12, 12A:
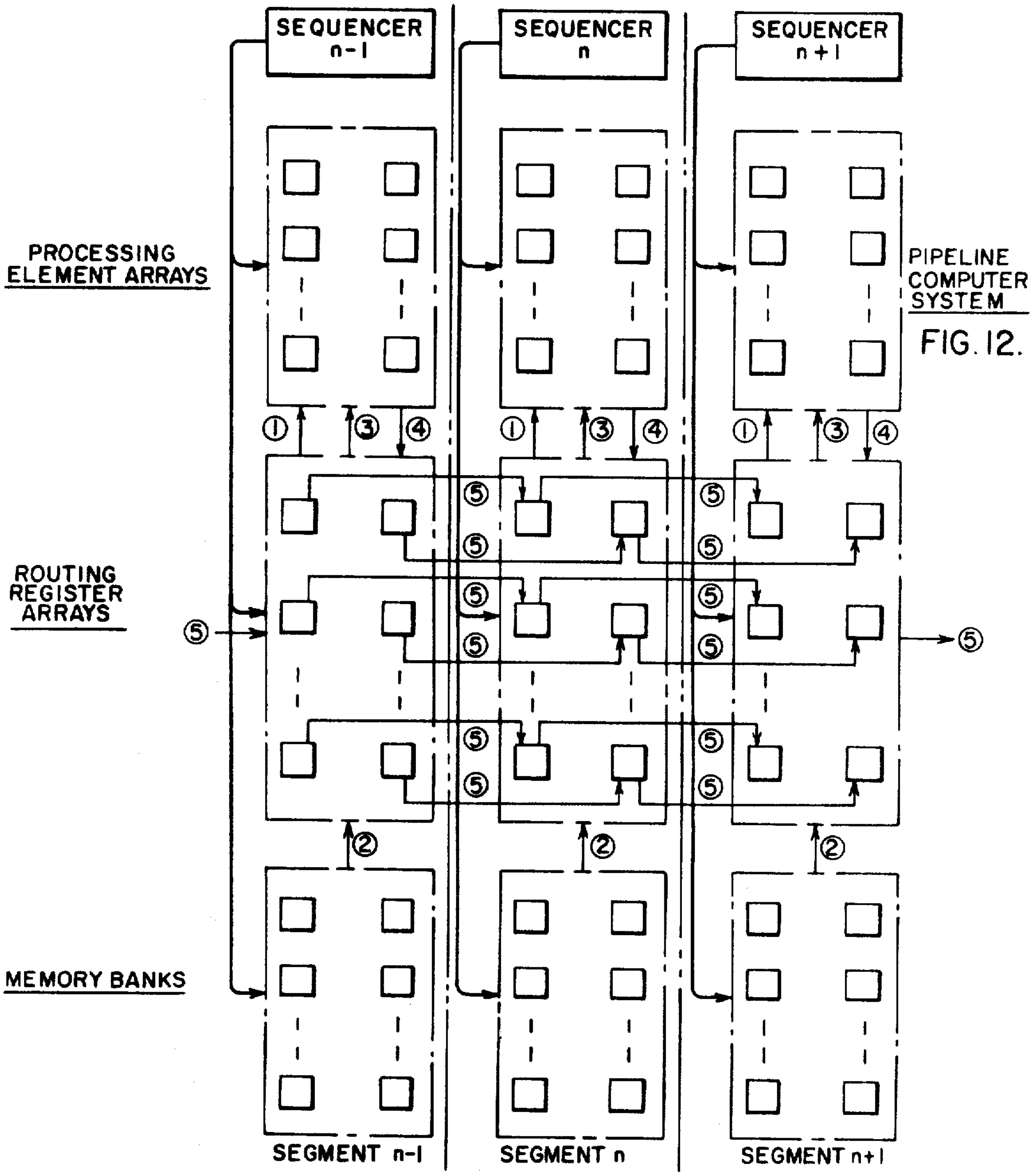
FIG. 12 illustrates the use of a computer described herein as a streaming processor.
FIG. 12A is a chart to aid in an understanding of FIG. 12.

In FIG. 12 there is illustrated three segments $n-1$, $n$ and $n+1$. In each segment illustrated, directly below the sequencer is depicted, in order, the processing element array, the routing register array and the memory bank. The circled numbers represent the steps in the solution of a typical problem. By way of example for purposes of illustration, the previously stated problem $$Z=(A+B)\times C/D$$

may be solved in the following manner.

Segment $n-1$ is assigned to do the computation $A+B$, segment $n$ is assigned to do the computation of multiplying by C the results of the computation of segment $n-1$, and segment $n+1$ is assigned to do the computation of dividing by D the results obtained from segment $n$. The output of segment $n+1$ therefore constitutes the answer Z. Each of the segments will operate as a small parallel network computer with the additional capability of being able to transfer information from segment to segment by means of the routing registers. There will therefore be simulated a series of 16 parallel streams each processing the data in identical formats. It is to be understood however that each segment could configure itself to operate as a sequential machine as illustrated in FIG. 11 to provide a single stream.

The first step in the operation is the transfer of the routing register contents to respective processing elements.

Initially, the quantity A is placed in the routing registers of segment $n-1$ (the sixteen routing registers may receive different values of A since 16 independent solutions will be provided in the example). Step 1 places A into the processing elements of segment $n-1$. Step 1, step 2 . . . step 5 refer to the circled numbers in FIG. 12. Let it be assumed that at this time in response to step 1, the routing registers of segments $n$ and $n+1$ transfer to zero.

Step 2 transfers a number (B in segment $n-1$, C in segment $n$ and D in segment $n+1$) from the memory units to respective routing registers, and step 3 transfers those numbers to the respective processing elements where the arithmetic subcomputation assigned to the particular segment is carried out. Step 4 brings the results of said computation back to the routing registers. The fifth step transfers the results of said computation to a correspondingly located routing register of the next segment.

In FIG. 12A there is illustrated a chart wherein the columns designate the output of the illustrated segments and wherein the rows represent time. At time $t_1$ after the first five steps it is seen that the output of segment $n-1$ is $A_1+B_1$ whereas there is no output from the other two segments since they started with zeros. The quantity in the routing registers of segment $n$ however is now $A_1+B_1$, output of segment $n-1$.

On the last transfer, the routing registers of segment $n-1$ receives a new A operand designated $A_2$. Repeating steps 1 through 5 again places the $A_2$ operand into the respective processing elements in segment $n-1$ and places the $A_1+B_1$ operand into the processing elements of segment $n$. Step 2 obtains the $B_2$ operand from the memory units of segment $n-1$ and obtains the $C_1$ operand from the memory units of segment $n$. Step 3 brings $B_2$ into the processing elements of $n-1$ and $C_1$ into the processing elements of segment $n$ where the respective addition and multiplication takes place. Step 4 places the result back into the routing registers and step 5 transfers the results to the next segment and it is seen from FIG. 12A that at time $t_2$, that is after the second repetition of the five steps, segment 1 outputs the quantity $A_2+B_2$ to the segment $n$ and segment $n$ outputs the quantity $(A_1+B_1)\times C_1$ to segment $n+1$. For the next series, step 1 places $A_3$ into the processing elements of segment $n-1$ places the quantity $(A_2+B_2)$ into the processing elements of segment $n$ and places $(A_1+B_1)\times C$ into the processing elements of segment $n+1$. The second step brings the quantity $B_3$ out of the memory units of segment $n-1$, $C_2$ from the memory units of segment $n$ and $D_1$ from the memory units of segment $n+1$. After step 4 the subsequent transfer of information allows segment $n+1$ to output the solution to the problem. FIG. 12A shows the outputs at each segment for six repetitions of the five steps involved. The computer arrangement provides in each of the sixteen processing streams, a solution to the equation $Z=(A+B)\times C/D$ involving four different values of A, of B, of C and of D.

In the fifth step where transfer is from a previous segment, the A values placed into the routing registers of segment $n-1$ may come from a previous segment, or from the input/output control means 38 (FIG. 1), or it could specially be provided from the memory units of segment $n-1$. It is apparent that the pipeline operation could be achieved and performed with variations of the steps given by way of example. In various instances, the memory units need not store the A, B, C and D numbers, which numbers in that case may be provided to the processing elements by means of the common word register 185 illustrated in the sequencer of FIG. 9.

Since the routing registers of all the segments receive the same command at the same time, as do the processing elements and memory units, the assumption has been made that the computation time for addition is substantially equal to the computation time for multiplication and division. If in actuality such is not the case, the time required for each segment to perform its sub-computation may be made equal to the other segments time if the multiplication is performed as a series of additions and shifts, and division as a series of subtractions and shifts. In this manner each of the segments would be performing substantially an addition or subtraction operation in the series required for a multiplication or division. This of course would necessitate more segments than shown in FIG. 12.

FIG. 13: PHYSICAL LAYOUT

Figure 13:
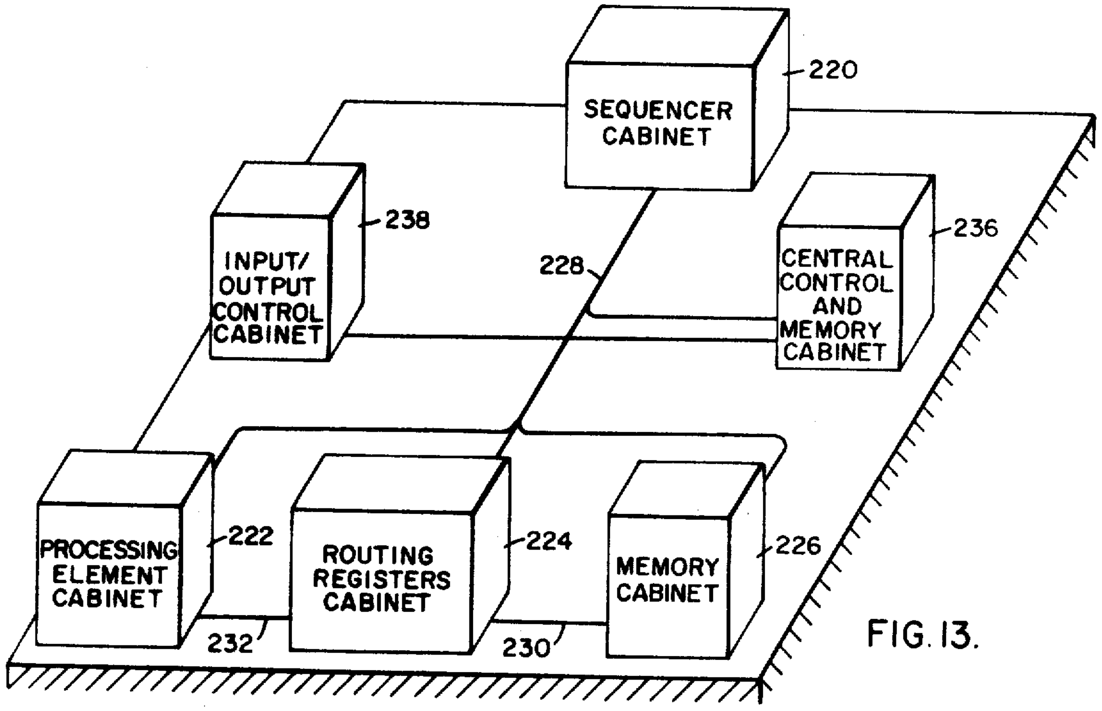
FIG. 13 illustrates a typical physical layout of the components forming the variable structure computer.

FIG. 13 illustrates the preferred physical grouping of the various portions of the computer illustrated in FIG. 1. Very basically, all circuits performing the same function are physically located in the same cabinet.

All of the sequencers 20–1 to **20–*n* are physically located in the sequencer cabinet 220. All of the processing elements of all of the segments are physically located in the processing element cabinet 222, all of the routing registers of the routing arrays 33–1 to 33–*n* are located in the routing register cabinet 224 and all of the memory units of the memory banks 28–1 to 28–*n* are located in the memory cabinet 226. Control signals to these cabinets and communication with the sequencers of the sequencer cabinet 220 are provided along line 228. Communication between the units in the memory cabinet 226 and the routing registers cabinet 224 is provided along line 230, and communication between the routing registers and the processing elements in cabinet 222 is provided along line 232**.

With the physical layout illustrated, a command sent to, for example the routing registers from the sequencers will be received by all of the routing registers at substantially the same time. This is a critical factor in the design of the computer since when operating in the nanosecond or picosecond range a difference of several feet in the travel time for a control signal may significantly affect proper operation. In a similar manner and with the 1:1 correspondence of processing elements and routing registers, and the 1:1 correspondence between the routing registers and memory units, a physical layout assures that, for example, all the processing elements in cabinet 222 receive the information from their respective routing registers in cabinet 224 at substantially the same time along line 232 (and vice versa) and that the routing registers in cabinet 224 receive information from the respective memory units of cabinet 226 substantially at the same time along line 230 (and vice versa).

The central control unit and memory for the central control may be located in cabinet 236 and the input/output control means in cabinet 238. It is to be noted that the various input/output equipment such as discs, tapes, Teletypes, etc. have not been illustrated nor has an operator's control console.

Although the present invention has been described with a certain degree of particularity it should be understood that the present disclosure has been made by way of example and that numerous modifications and variations of the structure and operations described herein are made possible in the light of the above teachings.

We claim as our invention:

1. A variable structure computer comprising:

(a) a plurality of segments each including a plurality of processing elements for carrying out logic and arithmetic operations, at least two of said plurality of processing elements in each segment being operable to carry out the same operations;

(b) circuit means for simultaneously supplying the processing elements of one segment with the identical control signals as the processing elements of the other segments and operable in response to predetermined conditions, for simultaneously supplying the processing elements of at least one segment with with different control signals than the processing elements of another segment.

2. A variable structure computer comprising:

(a) a plurality of computer segments each including (1) sequencer means for providing control signals in response to provided instructions, (2) a plurality of processing elements responsive to control signals provided by said sequencer means for carrying out operations;

(b) circuit means for supplying during one computer operating condition, identical instructions to each said sequencer, whereby said sequencers provide identical control signals; and (c) circuit means for supplying during another computer operating condition, a set of instructions to at least one sequencer, which set of instructions is different than the instructions supplied to other said sequencers.

3. A computer according to claim 2 in which each segment additionally includes:

(a) information transfer means, (1) said information transfer means being operable to transfer information from one segment to at least one other segment.

4. A computer according to claim 3 wherein each information transfer means includes:

(a) a plurality of register means each for the storage of an information word, (1) each said register means being connected to respective register means in at least one other segment.

5. A variable structure computer comprising:

(a) central control means;

(b) a plurality of computer segments each including (1) sequencer means for providing control signals for controlling operations within its associated segment, (2) a plurality of processing elements for receiving control signals from said sequencer means for carrying out logic and arithmetic operations, at least two of said plurality of processing elements being identical for carrying out identical operations, (3) memory means for storing information, and (4) information transfer means;

(c) circuit means, including said central control means, for operating all segments of said plurality of segments in an identical manner and being responsive to predetermined conditions for operating at least one said segment independently of the other segments of said plurality of segments.

6. A computer according to claim 5 wherein:

(a) the processing elements include, (1) a plurality of storage registers for storing information, and (2) a logic and arithmetic section for carrying out logic and arithmetic operations on the information stored in selected ones of said storage registers; and wherein:

(b) the independently operating segment includes (1) at least one precessing element responsive to a first set of control signals provided by the sequencer means for carrying out operations, (2) remaining processing elements being non-responsive to said first set of control signals and responsive to a second set of control signals for storing information in their storage registers for transfer to and use by, said at least one processing element, in its operations.

7. A computer according to claim 6 wherein:

(a) the said one processing element includes circuit means for carrying out the same operations as other processing elements, at greater speeds, when said one processing element and said other processing elements are instructed to perform the same task.

8. A variable structure computer comprising:

(a) central control means;

(b) a plurality of computer segments each including (1) sequencer means for providing control signals for controlling operation of its associated segment, (2) a plurality of processing elements each operable to receive control signals from said sequencer means for simultaneously carrying out logic and arithmetic operations, (3) a plurality of memory units each for a respective processing element, and each operable to store data and instructions, (4) a plurality of routing registers each operable to transfer information, to and receive information from (i) a respective one of said processing elements, (ii) a respective one of said memory units, (iii) other ones of said routing registers;

(c) each said sequencer means being operable to selectively receive instructions from said central control means or from said plurality of memory units.

9. A computer according to claim 8 wherein:

(a) the routing registers are additionally operable to transfer information to the routing registers of other segments.

10. A computer according to claim 8 wherein:

(a) at least one processing element includes circuit means for being non-responsive to the control signals provided to it and the other processing elements.

11. A variable structure computer comprising:

(a) a plurality of computer segments each including (1) sequencer means for providing control signals for controlling operations within its associated segment, (2) a plurality of processing elements for carrying out operatitons in response to control signals from said sequencer means, (3) memory means including a plurality of concurrently operating memory units, and (4) a plurality of routing registers each operable to transfer information to and receive information from, (i) a respective one of said processing elements, (ii) a respective one of said memory units, (iii) other ones of said routing registers, and (iv) the routing registers of another segment of said plurality of segments.

12. A computer according to claim 11 which includes:
(a) input/output means for the input and output of information to and from the segments.

13. A computer according to claim 12 wherein:
(a) the input/output means is communicative with the routing registers of the segments whereby information from the input/output means first enters a segment by means of the routing registers.

14. A variable structure computer comprising:
(a) a plurality of computer segments each including
(1) sequencer means for providing control signals for controlling operations within its associated segment,
(2) a plurality of processing elements for receiving control signals from said sequencer means for carrying out logic and arithmetic operations,
(3) information transfer means,
(4) memory means including a plurality of memory units for the storage of data and instructions,
(i) each said memory unit being communicative with said data transfer means,
(ii) each said memory unit being communicative with said sequencer means for transferring stored instructions to said sequencer means during one computer operating condition;
(b) central control means for supplying the sequencer means of said segments with instructions during another computer operating condition.

15. A variable structure computer comprising:
(a) central control means;
(b) a plurality of computer segments each including,
(1) memory means for the storage of data and instructions,
(2) circuit means for carrying out logic and arithmetic operations,
(3) sequencer means for providing control signals for controlling the operation of said circuit means, said sequencer means including,
(i) storage means for storing instructions,
(ii) means responsive to said instructions for providing said control signals,
(iii) gating means operable to selectively gate instructions from said central control means or said memory means, to said storage means.

16. A computer according to claim 15 wherein:
(a) the memory means includes a plurality of memory units;
(b) the storage means of the sequencer means includes a plurality of storage locations;
(c) each said memory unit being operable to store a respective group of instructions, forming part of a program to be performed, and being additionally operable to transfer concurrently with the other said memory units, an instruction to a respective one of said storage locations.

17. A computer according to claim 8 wherein:
(a) the processing elements, memory units and routing registers are in a 1:1:1 correspondence.

18. A computer according to claim 11 wherein:
(a) the processing elements are physically located in a first cabinet;
(b) the memory units are physically located in a second cabinet; and
(c) the routing registers are physically located in a third cabinet.

References Cited

UNITED STATES PATENTS

| | | | |
|---|---|---|---|
| 3,374,465 | 3/1968 | Richmond et al. | 340—172.5 |
| 3,364,472 | 1/1968 | Sloper | 340—172.5 |
| 3,349,375 | 10/1967 | Seeber et al. | 340—172.5 |
| 3,242,467 | 3/1966 | Lamy | 340—172.5 |

GARETH D. SHAW, Primary Examiner